Figure 3:
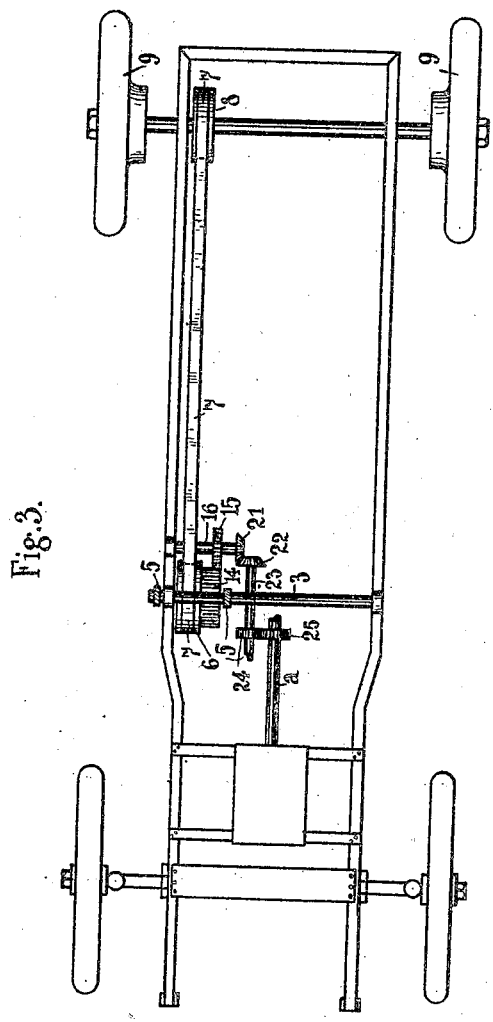

No. 822,679. PATENTED JUNE 5, 1906.
J. DE MAZARAKI.
COMBINED VEHICLE BRAKING AND STARTING DEVICE.
APPLICATION FILED SEPT. 12, 1905.
2 SHEETS—SHEET 1.
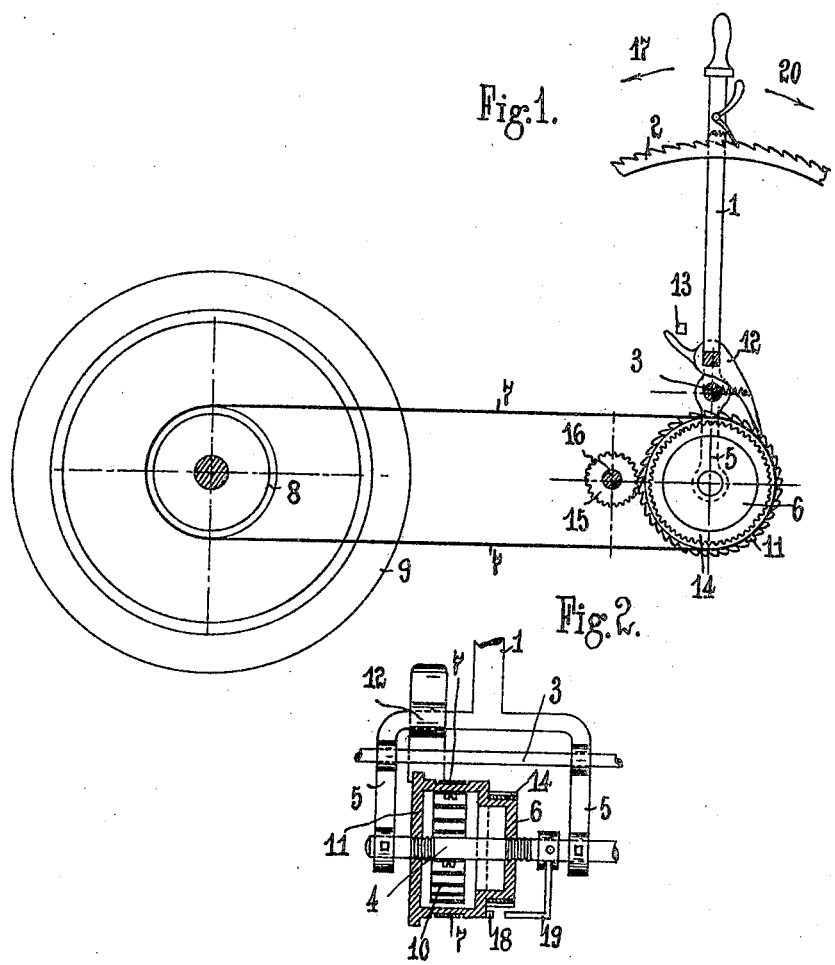

No. 822,679. PATENTED JUNE 5, 1906.
J. DE MAZARAKI.
COMBINED VEHICLE BRAKING AND STARTING DEVICE.
APPLICATION FILED SEPT. 12, 1905.

2 SHEETS—SHEET 2.

Witnesses:
William Doman
Waldo M. Chapin

Inventor:
Joseph de Mazaraki.
by
Rosenbaum & Stockridge
Attys.

UNITED STATES PATENT OFFICE.

JOSEPH DE MAZARAKI, OF ETTERBEEK, NEAR BRUSSELS, BELGIUM.

COMBINED VEHICLE BRAKING AND STARTING DEVICE.

No. 822,679.  Specification of Letters Patent.  Patented June 5, 1906.

Application filed September 12, 1905. Serial No. 278,174.

*To all whom it may concern:*

Be it known that I, JOSEPH DE MAZARAKI, a subject of the Russian Emperor, residing at Etterbeek, near Brussels, Belgium, have invented new and useful Improvements in and Relating to a Combined Vehicle Braking and Starting Device; and I do hereby declare the following to be a full, clear, and exact description of the same.

My present invention relates to vehicle braking and starting devices, the object being to provide a combined braking and starting device for motor-cars and the like wherein the power annihilated by the braking action when the car is stopped is accumulated by means of a particularly-arranged metal spring and utilized subsequently for starting the motor of the car, thus avoiding the use of the ordinary crank-handle for starting the motor.

In the accompanying drawings I have shown the preferred form of embodiment of my invention.

Figure 1 is a diagrammatical side elevation of a car-wheel connected with my improved braking and starting device, and Fig. 2 is a vertical cross-section through the spring-casing of the device. Fig. 3 is a top plan view of the frame of a vehicle provided with my improved braking and starting device.

Referring to the drawings, 1 indicates the usual brake-lever, adapted to be held in any desired position on the toothed segment 2 and pivoted near its lower end on a stationary pin 3. The forked lower end 5 of said lever carries a screw-threaded non-rotatable shaft 4, and arranged on the latter is a rotatable spring-case 6, around which passes an endless brake-band 7, passing also around a pulley 8, keyed on the axle of the wheel 9 to be braked. Arranged within the rotatable case 6 is a strong spiral spring 10, one end of which is attached to the shaft 4, while the other end thereof is attached to the wall of the case 6, so that said spiral spring will be wound up when said case is rotated, as hereinafter described.

The case 6 carries on one side a ratchet-wheel 11, made one therewith and coöperating with a pawl 12, pivoted on the forked end of the brake-lever 1. Said pawl is disengaged from the ratchet-wheel 11 by a stationary stop 13 when the brake-lever is moved forwardly in the direction of the arrow 20, Fig. 1. On the opposite side the case 6 carries a toothed wheel 14, adapted to mesh with a toothed pinion 15, keyed on an intermediate shaft 16, connected in any suitable way with the motor-shaft *a* of the vehicle. This connection may be made by means of a gear-wheel 21 on the shaft 16 and meshing with a gear-wheel 22 on a shaft 23, arranged at right angles with the shaft 16 and carrying a gear-wheel 24, meshing with another gear-wheel 25 on said motor-shaft *a*, Fig. 3.

Assuming the car to be in movement and the brake-lever 1 in its intermediate position, Fig. 1, when it is desired to stop the vehicle, the carman moves the brake-lever 1 in the direction of the arrow 17, so that the brake-band 7 will be tightened, and causes the case 6 to be rotated in its screw-threaded shaft 4, whereby the inner spiral spring 10 will be wound up. At the same time the case 6 is moved laterally by the action of the screw-threads of its shaft until a projection 18 of said case strikes against an adjustable stop 19, when the spiral spring 10 is completely wound up and the movement of said case stopped, whereupon the brake-band 7 slides around the case 6 until the vehicle is completely stopped. This arrangement serves to prevent the spring 10 from being wound up too strongly, thus avoiding breaks thereof.

In order to start the vehicle when the motor has been stopped, the carman moves the lever 1 in the direction of the arrow 20, Fig. 1, whereby the toothed wheel 14 is caused to mesh with the pinion 15, the pawl 12 being almost simultaneously disengaged from the ratchet-wheel 11 to permit the spring 10 to be expanded and rotate the case 6 with the toothed wheel 14, which in turn actuates the pinion 15, and therefore, also, the motor-shaft for the purpose of starting the motor of the vehicle.

The stationary stop 13 is arranged so that the pawl 12 is only disengaged, when the teeth of the gear-wheels 14 and 15 are completely engaged, so that the spring 10 cannot be expanded untimely without actuating the motor-shaft.

The gear-wheel 14 is constructed and arranged so as to be connected with the case 6 when the latter is actuated by the expansion of the inner spring, while said wheel 14 is loose on said case when it is actuated by the toothed pinion 15. This occurs when the motor-shaft is rotated by the action of the motive fluid, the lever 1 being not yet brought back to its intermediate position, so that the gear-wheels 14 and 15 are still in engagement. Should the wheel 14 not be loose in this case, the pinion 15 would cause the case 6 to rotate and wind up the spring 10 in opposite direction, whereby it would certainly be broken off.

My new combined braking and starting device offers great practical advantages. It avoids the use of the ordinary crank-handle, whereby the motor-shaft of a vehicle has been started heretofore. By reason of this automatic starting of the motor the carman may stop the latter each time he stops the vehicle, so as to save an appreciable quantity of fuel and avoid the prejudicial jerks and shocks produced by the movement of the motor when the vehicle is stopped.

The improved device may be readily applied to existing vehicles without appreciable changes in the ordinary construction, and it will be seen that my device acts quite independently from the will or attention of the carman.

It is manifest that my improved device is used only in combination with one wheel of the vehicle, the other wheel or wheels being braked by the usual means, suitably connected to the common brake-lever 1.

Having fully described my invention, what I claim, and desire to secure by Letters Patent, is—

1. In a device of the class described, the combination with a wheel of the car, a belt-pulley fast on the axle of said wheel and a brake-lever, pivoted near its lower end; of a fork made one with the lower end of said lever, a non-rotatable shaft, secured to the branches of said fork, a rotatable case or drum on said shaft, an endless brake-band or belt passing around said belt-pulley and case or drum; a spiral spring within the latter, one end of said spring being attached to the non-rotatable shaft, while the other end is attached to the case, so that said spring is wound up when the case is rotated by the action of the brake-band; means for holding the spring in operative position, and means for transmitting the power of said spring to the motor-shaft after moving the brake-lever to its starting position, substantially as set forth.

2. In a device of the class described, the combination with a wheel of the car, a belt-pulley fast on the axle of said wheel and a brake-lever, pivoted near its lower end; of a fork made one with the lower end of said lever, a non-rotatable shaft, secured to the branches of said fork, a rotatable case or drum on said shaft, an endless brake-band or belt passing around said belt-pulley and case or drum; a spiral spring within the latter, one end of said spring being attached to the non-rotatable shaft, while the other end is attached to the case, so that said spring is wound up when the case is rotated by the action of the brake-band; a ratchet-wheel, made one with said case, a pawl pivoted on the fork of the brake-lever and engaging said ratchet-wheel; means for automatically disengaging said pawl when the brake-lever is moved to its starting position, and means for transmitting the rotation of said case produced by the expansion of the spring to the motor-shaft of the car, substantially as set forth.

3. In a device of the class described, the combination with a wheel of the car, a belt-pulley fast on the axle of said wheel and a brake-lever, pivoted near its lower end; of a fork made one with the lower end of said lever, a non-rotatable shaft, secured to the branches of said fork, a rotatable case or drum on said shaft, an endless brake-band or belt passing around said belt-pulley and case or drum; a spiral spring within the latter, one end of said spring being attached to the non-rotatable shaft, while the other end is attached to the case, so that said spring is wound up when the case is rotated by the action of the brake-band; a ratchet-wheel, made one with said case, a pawl pivoted on the fork of the brake-lever and engaging said ratchet-wheel; means for automatically disengaging said pawl when the brake-lever is moved to its starting position; a gear-wheel arranged on said case, a toothed pinion arranged on an intermediate shaft in close proximity to said gear-wheel, and suitable connections between said pinion and the motor-shaft of the car, substantially as set forth.

4. In a device of the class described, the combination with a wheel of the car, a belt-pulley fast on the axle of said wheel, and the usual brake-lever, pivoted near its lower end; a fork extending downwardly from said lower end of the lever, a non-rotatable shaft secured to the branches of said fork; a rotatable spring-case on said shaft, and a spiral spring within said case; a brake-band or belt passing around said spring-case and belt-pulley, so as to rotate the spring-case and wind up the spring when the lever is moved to its braking position; a ratchet-wheel made one with the spring-case, and a pawl pivoted on the fork and engaging said ratchet-wheel; a gear-wheel on said spring-case and a toothed pinion, with which said gear-wheel may be brought into engagement when the brake-lever is moved to its starting position; means for disengaging said pawl when the gear-wheel and pinion are completely engaged, suitable connections between said pinion and the motor-shaft of the car, and means for stopping the rotation of the spring-case when the spring is completely wound up, substantially as set forth.

5. In a device of the class described, the combination with a wheel of the car, a belt-pulley fast on the axle of said wheel, and the usual brake-lever, pivoted near its lower end; a fork extending downwardly from said lower end of the lever, a non-rotatable shaft secured to the branches of said fork; suitable screw-threads provided on said shaft, a rotatable spring-case arranged on the latter and engaging the screw-threads thereof, a spiral spring within said case, and a brake-band passing around said spring-case and belt-pulley, so as to rotate and simultaneously move laterally said spring-case when the brake-lever is moved to its braking position; a ratchet-wheel made one with the spring-case, and a pawl pivoted on the fork of the brake-lever and engaging said ratchet-wheel; a gear-wheel on said spring-case and a toothed pinion, with which said gear-wheel may be brought into engagement when the brake-lever is moved to its starting position; means for disengaging said pawl when the gear-wheel and pinion are completely engaged, an adjustable stop on said screw-threaded shaft, adapted to arrest the movement of the spring-case when the spring is completely wound up, and suitable connections between said pinion and the motor-shaft of the car, substantially as set forth.

6. In a device of the class described, the combination with a wheel of the car, a belt-pulley fast on the axle of said wheel, and the usual brake-lever, pivoted near its lower end; a fork extending downwardly from said lower end of the lever, a non-rotatable shaft secured to the branches of said fork; suitable screw-threads provided on said shaft, a rotatable spring-case arranged on the latter and engaging the screw-threads thereof, a spiral spring within said case, and a brake-band passing around said spring-case and belt-pulley, so as to rotate and simultaneously move laterally said spring-case when the brake-lever is moved to its braking position; a ratchet-wheel made one with the spring-case, and a pawl pivoted on the fork of the brake-lever and engaging said ratchet-wheel; a gear-wheel on said spring-case and a toothed pinion, with which said gear-wheel may be brought into engagement when the brake-lever is moved to its starting position, said gear-wheel being connected with the spring-case when the latter is actuated by the expansion of the inner spring, while it is loose on the spring-case when it is actuated by said toothed pinion; a stationary stop, adapted to disengage said pawl from the ratchet-wheel when the brake-lever is moved to its starting position and after said gear-wheel meshes with said pinion; an adjustable stop on said screw-threaded shaft adapted to arrest the movement of the spring-case when the spring is completely wound up, and suitable connections between said pinion and the motor-shaft of the vehicle, substantially as set forth.

In testimony whereof I have signed my name to this specification in the presence of two subscribing witnesses.

JOSEPH DE MAZARAKI.

Witnesses:
CHARLES HONOLD,
GREGORY PHELAN.